UNITED STATES PATENT OFFICE.

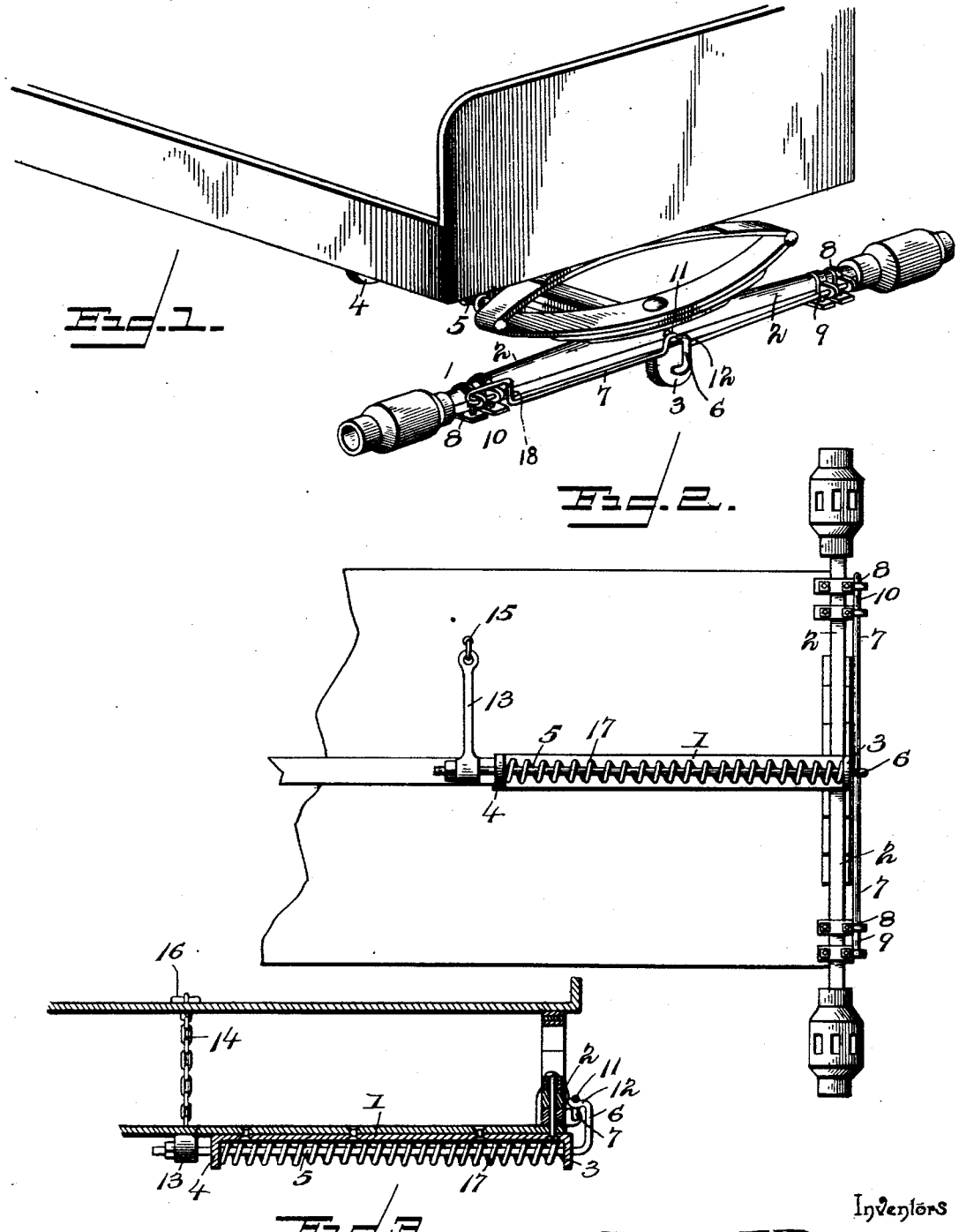

JOHN JOSEPH RICK AND LEWIS LARSON, OF CENTRALIA, WISCONSIN.

HORSE-DETACHER.

SPECIFICATION forming part of Letters Patent No. 520,337, dated May 22, 1894.

Application filed October 2, 1893. Serial No. 487,044. (No model.)

*To all whom it may concern:*

Be it known that we, JOHN JOSEPH RICK and LEWIS LARSON, citizens of the United States, residing at Centralia, in the county of Wood and State of Wisconsin, have invented a new and useful Horse-Detacher, of which the following is a specification.

The invention relates to improvements in horse detachers.

The object of the present invention is to improve the construction of horse detachers, and to provide a simple and inexpensive device, which will enable the pole or shafts of a vehicle to be readily detached in case of a run away to prevent injury to the vehicle and its occupants.

The invention consists in the construction and novel combination and arrangement of parts hereinafter fully described, illustrated in the accompanying drawings and pointed out in the claims hereto appended.

In the drawings—Figure 1 is a perspective view of a portion of a vehicle provided with a horse detacher constructed in accordance with this invention. Fig. 2 is a reverse plan view of the same. Fig. 3 is a longitudinal sectional view.

Like numerals of reference indicate corresponding parts in all the figures of the drawings.

1 designates a plate, secured to the lower face of the reach of a running gear of a vehicle near the front axle 2 and provided at its ends with depending bearings 3 and 4, in which is journaled a rock-shaft 5; and the latter is provided at its front end with a vertically disposed arm 6 connected with an attachment rod 7 disposed longitudinally of the front axle 2, and forming pivots of thill and pole couplings 8. The attachment rod has one end 9 arranged in one of the couplings 8, and its other end is bent on itself to form a pivot or coupling pin 10 for the other coupling 8. The end 9 enters its coupling from the inner side thereof, and the other end 10 of the rod 7 enters its coupling from the outer side thereof, whereby by moving the rod in the direction of its end 10, its ends will be withdrawn from the couplings to release a pole or shafts. At an intermediate point the attachment rod is provided with an upward loop or bend 11, which receives a rearward projection 12 of the arm 6 of the rock-shaft, whereby when the latter is turned, the rod 7 will be actuated. The rear end of the rock-shaft has secured to it by a nut a horizontally disposed arm 13, which is provided at its outer end with an eye, and attached to the latter is a chain 14, which extends upward to an opening in the body 15 of the vehicle, and is provided with an enlarged ring 16 adapted to serve as a handle to enable the rock-shaft to be readily turned.

The rod 7 is held normally in position for locking a pole or thills by a spiral spring 17 disposed on the rock-shaft between the bearings 3 and 4, and having one end secured to the shaft, and its other end attached to the plate 1; and the movement of the rock-shaft is limited to prevent the rod 7 from being entirely withdrawn from the couplings by a stop shoulder 18 formed by an angular bend of the rod 7, and arranged adjacent to the inner side of the thill coupling, which receives the end 10 of the rod 7.

It will be readily seen that the device is simple and comparatively inexpensive in construction, that it is adapted to be readily applied to any vehicle to be used in connection with the ordinary thill or pole coupling, and that it is capable of quickly detaching a pole or thills to disconnect a horse from a vehicle to prevent injury to the latter and its occupant in case of a run away.

Changes in the form, proportion and the minor details of construction may be resorted to without departing from the principle or sacrificing any of the advantages of this invention.

What we claim is—

1. The combination of a vehicle provided with couplings, a rod arranged longitudinally of the front axle and having its ends arranged in the coupling and capable of a limited longitudinal movement and provided intermediate of its ends with a loop, a rock-shaft journaled in suitable bearings and arranged longitudinally of the vehicle and provided at its front end with an arm engaging the loop of said rod, a spring for holding the rod normally in engagement with the couplings, and an arm extending from the rock shaft and connected with the body of the vehicle, substantially as described.

2. The combination with a vehicle provided with couplings, a rod having its ends arranged in the couplings and capable of a limited longitudinal movement and provided intermediate of its ends with a loop, a plate disposed longitudinally of the vehicle and provided with bearings, a rock-shaft journaled in the bearings of the plate and provided at its front end with an arm engaging the loop of said rod, an arm extending from the rear end of the shaft and connected with the body of the vehicle, and a spring for holding the rod normally in engagement with the couplings in position for coupling, substantially as described.

3. The combination with a vehicle provided with couplings, of a rod extending along the front axle and having its ends 9 and 10 arranged in the couplings and provided adjacent to the end 10 with an angular bend arranged to engage the adjacent coupling, a plate disposed longitudinally of the vehicle and provided with bearings, a rock-shaft journaled in the bearings of the plate and provided at its front end with an upward extending arm connected with the rod, a spring disposed on the rock-shaft and connected with the same and with the plate, and a horizontally disposed arm extending from the rear end of the rock-shaft and connected with the body of the vehicle, substantially as described.

In testimony that we claim the foregoing as our own we have hereto affixed our signatures in the presence of two witnesses.

J. JOSEPH RICK.
LEWIS $\overset{\text{his}}{\times}$ LARSON.
mark

Witnesses:
  F. L. ROURKE,
  HELEN E. KRAMER.